United States Patent [19]

Shibasaki

[11] 4,313,171
[45] Jan. 26, 1982

[54] INTERNAL PRESSURE DETERMINING METHOD AND SYSTEM FOR HERMETICALLY SEALED CONTAINERS USING ELECTROMAGNETIC INDUCTION

[75] Inventor: Kyuichi Shibasaki, Yokosuka, Japan

[73] Assignee: Toyo Seikan Kaisha, Ltd., Tokyo, Japan

[21] Appl. No.: 55,047

[22] Filed: Jul. 5, 1979

[30] Foreign Application Priority Data

Jul. 8, 1978 [JP] Japan ............................ 53-083171

[51] Int. Cl.$^3$ .......................... G01L 9/10; G01M 3/36
[52] U.S. Cl. ...................................... 364/558; 73/52; 324/207; 364/508
[58] Field of Search ............... 364/506, 508, 550, 551, 364/552, 558; 73/52; 324/207

[56] References Cited

U.S. PATENT DOCUMENTS

| 3,371,781 | 3/1968 | Ambruster et al. | 73/52 X |
| 3,802,252 | 4/1974 | Hayward et al. | 73/52 |
| 4,030,027 | 6/1977 | Yamada et al. | 324/207 |
| 4,160,204 | 7/1979 | Holmgren et al. | 324/207 |
| 4,187,718 | 2/1980 | Shibasaki | 73/52 |
| 4,188,819 | 2/1980 | Egee et al. | 73/52 |

Primary Examiner—Felix D. Gruber
Attorney, Agent, or Firm—Jordan and Hamburg

[57] ABSTRACT

An internal pressure inspecting method and system for determining the degree of unevenness of the surface of an elastic cover of each of one or more hermetically sealed containers, the unevenness being produced according to the internal pressure. The distance from a fixed position exterior of the hermetically sealed container to said cover surface is determined by measuring the change in inductance utilizing the action of electromagnetic induction, at a plurality of points i.e. the center and peripheral portions thereof. A value is derived by calculation of the difference between a mean value of both measured values at any one point in the peripheral portion and at the position on the diametric line which is in symmetrical relation therewith with the center of the container cover as the center of symmetry, and the measured value at the center of the container cover. The internal pressure of said hermetically sealed container is determined from this value.

39 Claims, 11 Drawing Figures

INTERNAL PRESSURE DETERMINING METHOD AND SYSTEM FOR HERMETICALLY SEALED CONTAINERS USING ELECTROMAGNETIC INDUCTION

BACKGROUND OF THE INVENTION

This invention relates to a method and system for a non-destructive inspection of the internal pressure of hermetically sealed containers such as bottled and canned goods. More particularly, it provides a method and system whereby cans housed in a carton case can be inspected from the exterior without the need to open the case.

Heretofore, various methods of inspecting a single can being conveyed on a conveyor have been employed. Also, the possibility of inspection within a carton case is disclosed in Japanese Patent Public Disclosures Nos. 34376/74 (U.S. Pat. No. 3,802,252) and 99554/76. Furthermore, a promising method is disclosed in Japanese Utility Model Publication No. 22316/66 (U.S. Pat. No. 3,206,027).

In the first example mentioned above, vibration is generated in the cover by means of an electromagnetic pulse and, on the basis of the correlation between the number of vibrations and the internal pressure of a can, a discrimination of good or bad is made.

During a long-term storage of canned goods, sometimes the contents change in quality and evolve carbon dioxide or hydrogen gas, resulting in internal pressure increases, and the initial reduced pressure for the foods changes to a positive internal pressure.

Figure 1:
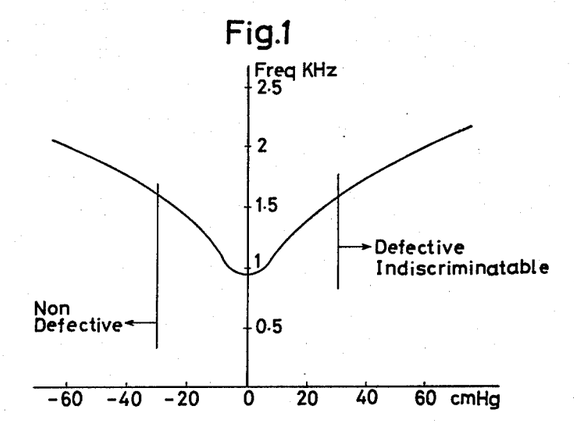
FIG. 1 is a curvilinear graph showing the correlation characteristic of the internal pressure of a can and the vibration number of its cover.

Since the vibration of a can cover is determined by the stress of the dover surface, the relation between the internal pressure of the can and the number of vibration has a basic defect such that, as shown in FIG. 1, there is an area where the discrimination of good or bad is impossible because of the same frequency of both positive and negative pressures.

As means for detecting vibration, mention may be made of a method of measuring the damping of amplitude. In this method, however, the internal pressure of a can and the damping condition are not always correlated with each other because in a carton case the change in contacting state between cans and also between cans and the side or ceiling plate of the case greatly contributes to the damping of vibration. Thus, this method lacks utility.

The foregoing third example is a method of measuring the degree of unevenness of the can cover by the change in effective inductance of an electromagnetic coil.

A carton is an electrical insulator and this is not affected magnetically, for which reason an intra-carton measurement and discrimination is considered promising.

Figure 2:
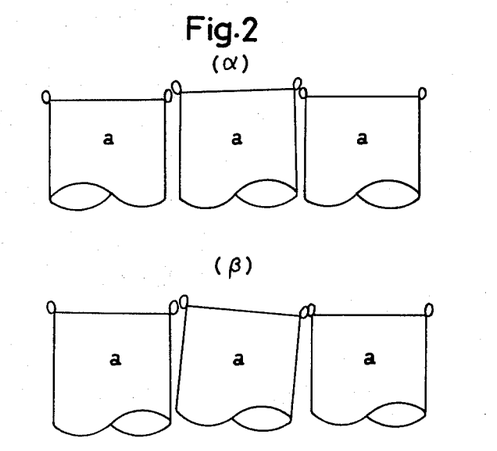
FIG. 2 shows raised conditions of the seamed portions of cans housed in a carton case, in which ($\alpha$) illustrates a mounted and floated state of both sides of a can, while ($\beta$) illustrates an inclined mode with one side in a mounted state.

The above method is fairly effective for inspecting a single can on a conveyor, but the cans housed in a carton are not always arranged on the same plane. The bottom of a carton may be uneven, or as shown in FIG. 2($\alpha$)($\beta$) cans a, may contact each other resulting in the seamed portions mounting each other, thus causing tilting or floating of can. In the measurement from the exterior of the carton, the correlation with the internal pressure of a can is doubtful.

For example, in the case of a normal can 77 mm in diameter with a reduced internal pressure of 50 cmHg, a concave deflection is 1 mm at the most, while the change in distance caused by mounting of the seamed portions may be as much as 3 mm.

Because of this drawback the so-called single point measurement in which the distance to the central portion of the cover surface is measured by a fixed detector is unreliable.

SUMMARY OF THE INVENTION

It is an object of this invention to provide an internal pressure inspecting method and system for hermetically sealed containers capable of recognizing the mode of deformation of an object based on two- or three-dimensional data by a simultaneous measurement in multi-measuring points which utilizes the electromagnetic induction phenomenon.

It is another object of this invention to provide an internal pressure inspecting method and system for hermetically sealed containers in which the recognition of the deformation mode of an object is made by the deviation between measured values in the central and peripheral portions of the cover of a hermetically sealed container.

It is a further object of this invention to provide an internal pressure inspecting method and system for hermetically sealed containers in which the mode of deformation of an object with a defective internal pressure is decided and recognized by the comparison between a predetermined reference level and the deviation obtained from measured values.

It is another object of this invention to provide an internal pressure inspecting method and system for hermetically sealed containers whereby a group of hermetically sealed containers can be inspected at a time.

It is a further object of this invention to provide an internal pressure inspecting method and system whereby a group of hermetically sealed containers as they are housed in a carton can be subjected to measurement.

It is still a further object of this invention to provide an internal pressure inspecting method and system whereby hermetically sealed containers or a carton case containing a group of hermetically sealed containers can be measured and inspected continuously while they are conveyed at a constant speed.

BRIEF FIGURE DESCRIPTION

Other objects of this invention will become apparent from the following description and the accompanying drawings.

DETAILED DISCLOSURE

The basic principle of the method of this invention utilizes the human habit where a man tries to judge the shape of an object by the tactile impression of his fingers alone, with the eyes closed, he touches various points of the object or continuously scans the object by touch throughout its extent. In engineering terms, this corresponds to the basic principle of conducting a two- or three-dimensional multi-point measurement by scanning.

Figure 3:
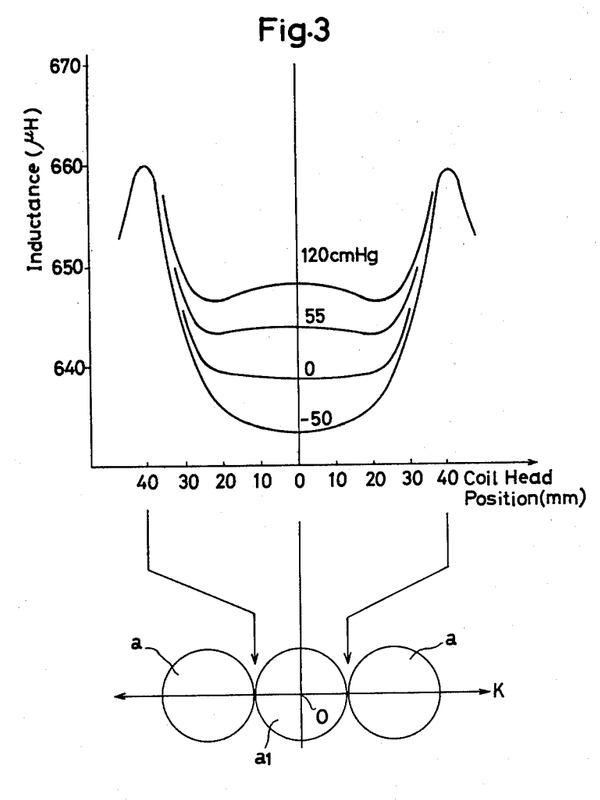
FIG. 3 is a curvilinear correlation characteristic graph showing a continuous deformation mode of each measuring point of a cover in the absence of an inclined state, in terms of the position of a detection coil head and the change in inductance.

The same way of thinking was experimented in the foregoing method utilizing the change in inductance of an electromagnetic coil, and the results are graphically illustrated in FIG. 3.

Can dia. 77 mm$\phi$, coil dia. 20 mm$\phi$, distance between the upper end of can and coil, 15 mm.

i. Reduced intra-can pressure: 50 cmHg
ii. Intra-can pressure: 0
iii. Intra-can pressure: +55 cmHg
iv. Intra-can pressure: +120 cmHg The measurement was made using an AC bridge.

As shown in the figure, the change in effective inductance with the position in the direction of the can diameter varies according to the intra-can pressure, showing a profile corresponding to the shape of unevenness of the can cover in the range of about 20 mm from the center of the can. The value at the center vs. the value at the distance of 20 mm (defined as a value in peripheral measuring point) is correlated with the change in intra-can pressure to give a relation of a monotonous increase, which shows the possibility of discrimination of the degree of unevenness by scanning.

Figure 4:
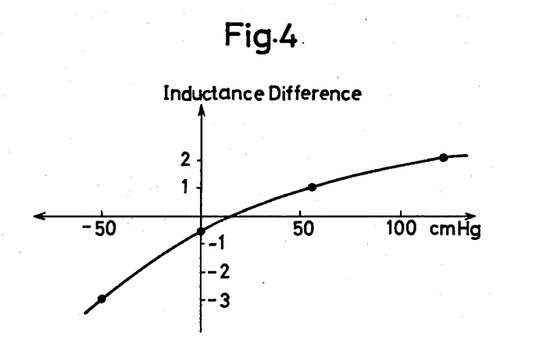
FIG. 4 is a curvilinear graph in which the measurement in the central measuring point for the peripheral measuring points of the cover in the correlation characteristic curve shown in FIG. 3 was correlated with the change in intra-can pressure.

In FIG. 4, the value of (inductance difference)=(value of peripheral measuring point)—(value of central point) is plotted, with positive and negative values thereof indicating convex and concave deformation respectively.

An experiment was made to see if the same way of thinking can be applied or not to the floating and inclination of can caused by a mounted state of seamed portions as exemplified in FIG. 2. As to floating, the same experiment as that shown in FIG. 3 was made in which the coil was brought near to the can cover by 3 mm equal to the size of the seamed portion; as a result, within 30 mm in diameter from the center of the can all the measured values were 10 $\mu$H larger with little change in profile. This corresponds to a parallel movement of each of the correlation characteristic curves shown in FIG. 3 to the direction larger in value by 10. Thus, the conclusion obtained from FIG. 4 can be applied as it is.

Figure 5:
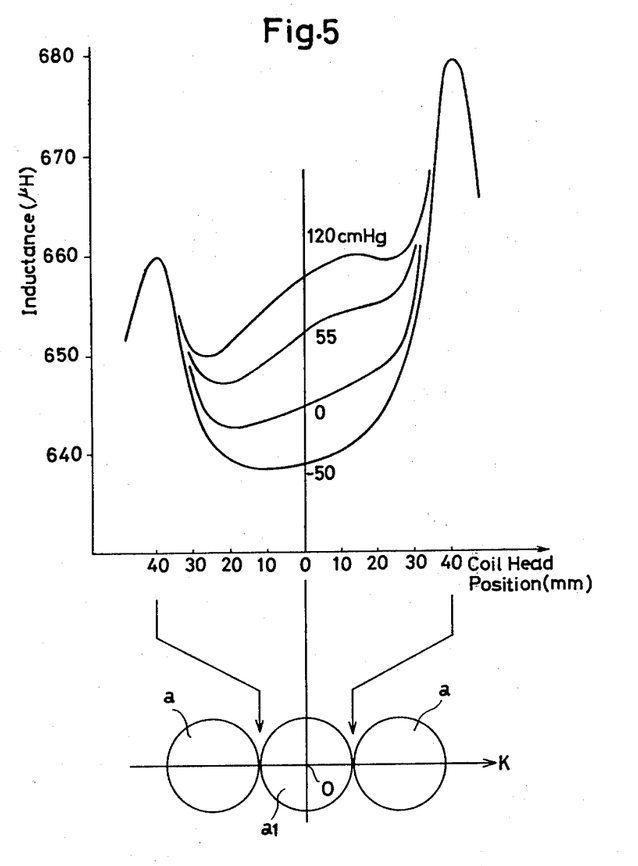
FIG. 5 is a curvilinear correlation characteristic graph similar to that shown in FIG. 3 but in the presence of an inclined state.

Next, the change in inductance regarding the inclination of can was measured, the results of which are shown in FIG. 5.

Figure 6:
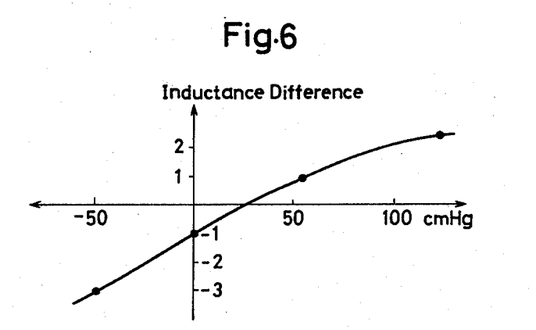
FIG. 6 is a curvilinear graph similar to that shown in FIG. 4 in the correlation characteristic curve of FIG. 5.

As shown in the same figure there was obtained a profile of a higher inclination on the mounted side of a can. In such a case, usually the unevenness of the center is judged by comparing a mean value of two opposed points equally spaced from the center with the value in the central point. If this is here applied, the results of FIG. 6 are obtained, which are almost the same as the results shown in FIG. 4. Thus, it became clear that even if there is an inclination, the degree of unevenness can be judged.

To check a can with a different diameter, moreover, the same measurement was made with respect to a fruit juice drink can 55 mm in diameter; as a result, there was obtained a profile which was the same as a compressed state to about two-thirds from the side direction of FIGS. 3 and 5. Also with respect to the difference between the value measured in the position 15 mm from the center of can and the value measured in the center, namely the value indicative of an uneven shape, it became clear that the resulting curve shows the same tendency as those shown in FIGS. 4 and 6.

Figure 7:
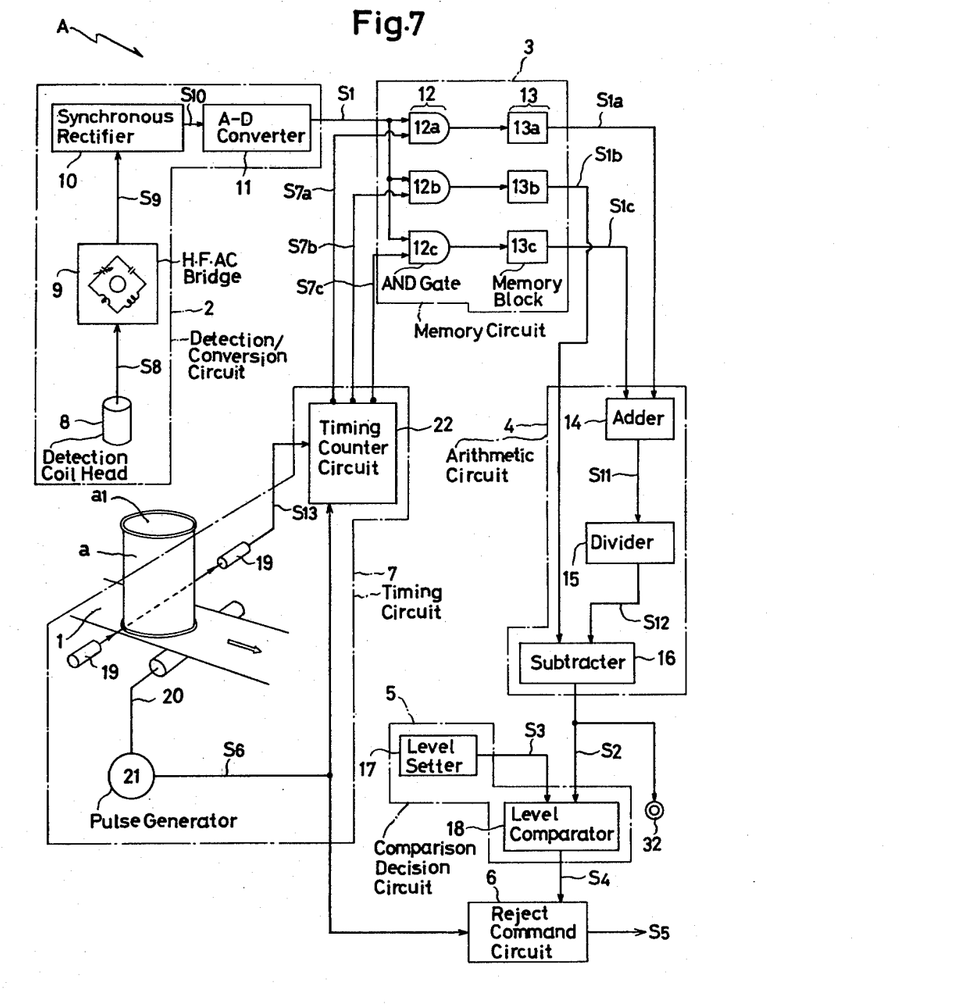
FIG. 7 is a block diagram of system A of this invention according to the flowchart method.

The following description is now provided with reference to FIG. 7 about the basic construction of a system according to this invention in which the principle of the method of this invention has been applied to the case of inspecting cans one by one.

An internal pressure inspection system A according to this invention is an organically connected system of a detection/conversion circuit 2 which detects from any fixed position the change in effective inductance resulting from the degree of unevenness of multi-measuring points in the central and peripheral portions on the diametrical line coincident with the advancing direction of a cover a1, of each can a, which passes very near the said fixed position at a constant speed on a conveyor 1, then converts the detected signal into a DC voltage and outputs a digital signal; a memory circuit 3 which temporarily stores the digital signal S1 from the detection/conversion circuit 2 for each said measuring point and simultaneously with input of the digital signal S1 at the final measuring point of each cover a1, reads and updates digital signals S1a-S1c all at once, an arithmetic circuit 4 which calculates a mean value from all the digital signals S1a, S1c in the peripheral measuring points of the cover a1, sent from the memory circuit 3, then generates a signal indicative of the distance deviation thereof from the digital signal S1b at the central measuring point of the cover a1; a comparison/decision circuit 5 which compares the deviation signal S2 from the arithmetic circuit with a pre-set reference level signal S3 and, when the deviation signal S2 is over the upper or lower limit of the reference level signal S3, outputs a can defective signal S4; a reject command circuit 6 which when it receives the defective signal S4 from the comparison/decision circuit 5 outputs a reject S5 after a predetermined delay in the timing counter circuit 22; and a timing circuit 7 which, when the can a, passes, sends a clock pulse signal S6 which is synchronized with the movement of the conveyor 1 to the reject command circuit 6, the timing circuit 7 counting the clock pulse signal S6 and applying memory timig signals S7a-S7c successively to the memory circuit 3.

The detection/conversion circuit 2 consists of a combined configuration of a ferrite-cored detection coil head 8 of inductance 600 $\mu$H, e.g. a honey-comb coil of 10 mmφ ID by 20 mmφ OD, disposed in the foregoing fixed position and adapted to produce an induced current signal S8 which has been induced according to the degree of unevenness of the multimeasuring points in the central and peripheral portions on the diametrical line coincident with the advancing direction of the cover1, of each can, a, which passes just under the said fixed position at a constant speed on the conveyor 1; a high-frequency AC bridge circuit of for example a 500 kHz carrier signal which generates an AC voltage signal S9 successively on the basis of the induced current signal S8; a synchronous rectifier 10 for example equipped with an amplifier rectified synchronously by the carrier signal of the high-frequency AC bridge circuit and having a linearity up to the maximum output of ±10 V, the synchronous rectifier 10 functioning to rectify the AC voltage signal S9 and convert it into a DC voltage signal S10; and a high speed analog-digital converter 11 of for example full scale ±10 V, conversion speed 1 μs, 10-bits, which converts the DC voltage signal S10 into the digital signal S1. The coil head 8 is disposed in a position opposed to the cover1, of the cana, which is conveyed on the conveyor 1, and it is connected to the high-frequency AC bridge circuit 9 from which is obtained the AC voltage signal as an unbalanced output according to the distance from the surface of the cover1, of the cana, and the unbalanced output from the bridge is converted into a DC voltage by the synchronous rectifier 10. Since the cana, is conveyed at a constant speed by the conveyor 1, the output of the synchronous rectifier 10 shows a profile corresponding to the unevenness of the can cover1, with respect to time. Thereafter, the output of the synchronous rectifier 10 is converted into the digital signal S1 by the analog-digital converter 11.

The memory circuit 3 consists of a combined configuration of AND gate circuits 12 disposed in parallel according to the number of the multimeasuring points on the diametrical line of the cover1, of the cana, and adapted to allow the passing output of the digital signal S1 from the detection/conversion circuit 2 upon receipt of the memory timing signals S7a–S7c separately from the timing circuit 7, and memory circuits 13, for example, a 10-bit C-MOS IC memory, disposed in parallel and connected in series with AND gate circuits 12a–12c, the memory circuits 13 functioning to temporarily store the digital signal S1 and read all the digital signals S1a–S1c simultaneously when the final digital signal S1c from each cover1, has been input.

The arithmetic circuit 4 consists of a combined configuration of an adder 14 which adds the digital signals S1a and S1c except S1b at the center of the cover1, of the cana, which have been read from the memory circuit 3, and outputs an addition signal S11; a divider 15 which divides the addition signal S11 by 2, the number of the added digital signals S1a and S1c, and outputs a mean value signal S12; and a subtractor 16 which subtracts the digital signal S1b at the center of the cover1, from the mean value signal S12 and outputs the deviation signal S2. Thus, the arithmetic circuit 4 is composed of TTL logical element and performs operation at high speed by a separately provided 0.5 μs crystal oscillator using an operation clock (not shown).

The comparison/decision circuit 5 consists of a combined configuration of a level setter 17 which manually presets the reference level signal S3, and a level comparator 18 as a digital comparator composed for example of TTL logical element by utilization of the conventional technique and device, the level comparator 18 functioning to compare the deviation signal S2 from the arithmetic circuit 4 with the reference level signal S3 and output the defective signal S4 when the deviation signal S2 exceeds the upper or lower limit of the reference level signal S3.

The timing circuit 7 consists of a combined configuration of a photosensor 19 which detects the passing of each cana, and generates a passing detection signal S13 for positioning the cana, with respect to the detection coil head 8; a pulse generator 21 mounted on a conveyor drive shaft 20 and adapted to generate the clock pulse signal S6 in the unit of second and in synchronism with the movement of the conveyor 1, for example, generate one pulse every time the conveyor 1 moves one millimeter; and a timing counter 22 which counts the clock pulse signal S6 during receipt of the passing detection signal S13 and outputs the memory timing signals S7a–S7c successively to the memory circuit 3. The positional relation between the photosensor 19 and the detection coil head 8 is determined by the initial measuring point on the diametrical line K which is coincident with the advancing direction of the cover1, and in the case of the cana, shown in FIG. 3, it is 20 mm spaced from the central measuring point O; that is, at the instant the photosensor 19 detects the front side of the cana, the detection coil head 8 is spaced 20 mm in the advancing direction of the conveyor 1 from the center of the cana.

The inspection procedure according to this invention applied to system A of the invention is described below with reference to FIG. 7.

When the photosensor 19 detects that the cana, on the conveyor 1 has arrived at the first measuring point, measurement and calculation are started. Upon detection of the front side end of the cana, by the photosensor 19 the timing counter circuit 22 in the timing circuit 7 generates the first memory timing signal S7a, and the digital signal S1 resulting from a previous analog to digital conversion with the same signal pulse is stored in the first memory 13a of the memory circuit 3.

When the center of the cana, being carried on the conveyor 1 has reached just under the detection coil head 8, the second memory timing signal S7b is issued, and the digital signal S1 resulting from a previous analog to digital conversion with the same signal pulse is stored in the second memory 13b.

The memory timing signal S7b is issued when the conveyor 1 has moved by a length which has manually been set in the timing counter circuit beforehand according to the diameter of the cana, the movement of the conveyor 1 being measured by counting the clock pulse signal S6 generated by the pulse generator 21 which is mounted on the conveyor drive shaft 20.

When the conveyor 1 has further moved and a peripheral measuring point of the cana, has reached under the coil head 8, the third memory timing signal S7c is issued, and the digital signal S1 resulting from a previous analog to digital conversion with the same signal pulse is stored in the third memory 13c.

The digital signals S1 in the central and peripheral portions of the cana, have now all appeared, so with these three values the arithmetic operation as referred to in connection with FIG. 6 is performed and it must be completed before arrival of the next cana, but this is not so difficult.

Upon completion of the storing action of the third memory 13c with the digital signal S7c, the digital signals S1a and S1c are read out and both values are added by the adder 14 and the resulting sum is divided by 2 by the divider 15 to give the mean value signal S12 as a mean value of the digital signals S1a and S1c.

From the mean value signal S12 is subtracted the digital signal S1b at the center of the cana, by the substractor 16 to obtain the difference as the deviation signal S2 which is indicative of the degree of unevenness of the can coveral, shown in FIG. 6.

Whether the cana, is non-defective or defective is determined by the degree of unevenness of the coveral; that is, the manually preset reference level signal S3 and the deviation signal S2 indicative of the degree of unevenness are compared with each other by the level comparator 18 and the can with a deviation value above or below the reference level signal S3 is decided to be defective; whether it should be above or below depends on the properties of the contents of the cana.

For the cana, determined to be defective, the can defective signal S4 as the output of the level comparator 18 is delayed in synchronism with the moving distance of the conveyor 1 by the reject command circuit 6, and reject means (not shown) is driven to remove the defective can from the conveyor 1.

A system according to this invention for simultaneously measuring and inspecting a group of cansa, arranged in matrix form in a carton case (not shown) is described below on the basis of the foregoing system A of this invention and with reference to FIG. 8.

An internal pressure inspection system B according to this invention is, like the system A of this invention, is an organically connected system of the detection/conversion circuit 2, the memory circuit 3, the arithmetic circuit 4, the comparison/decision circuit 5, the reject command circuit 6 and the timing circuit 7.

The detection/conversion circuit 2 consists of a combined configuration of detection coil heads $8_1-8_n$ provided by the number corresponding to the number of columns and adapted to detect, simultaneously in parallel from a predetermined position, induced current signals $S8_1-S8_n$ which have been induced according to the degree of unevenness of the measuring points in the central portion O and in the peripheral portions on the diametrical line K coincident with the advancing direction of each coveral, in each column of cansa, which are housed in matrix form (as shown in FIGS. 3 and 5) in the carton (not shown) the carton (not shown) passing just under the said predetermined position at a constant speed while being carried on the conveyor 1; high-frequency AC bridge circuits $9_1-9_n$ disposed in parallel and connected in series with the the detection heads $8_1-8_n$ respectively, the AC bridge circuits $9_1-9_n$ functioning to unbalancedly generate AC voltage signals $S9_1-S9_n$ separately and successively on the basis of the induced current signals $S8_1-S8_n$; synchronous rectifiers $10_1-10_n$ disposed in parallel and connected in series with the high-frequency AC bridge circuits $9_1-9_n$, the synchronous rectifiers $10_1$ functioning to rectify the AC voltage signals $S9_1-S9_n$ separately and convert them into DC voltage signals $S10_1-S10_n$; a scanner 23 which is preset by a matrix number switching signal S14 from the timing circuit 7 in accordance with the matrix number (the number of rows and columns) of the cansa, the scanner 23 functioning to input the DC voltage signals $S10_1-S10_n$ simultaneously in parallel, put them in order and output DC voltage signals $S10_1-S10_n$ in orderly manner; and the analog-digital converter 11 which converts the DC voltage signals $S10_1-S10_n$ from the scanner 23 one by one into digital signals $S1_1-S1_n$. The detection coil heads $8_1-8_n$ are disposed in correlation with each column of the cansa, in the carton case (not shown) and are provided in the maximum conceivable number, and they are arranged above and at right angles with the conveyor 1 in the position where the center of each column of the cansa, in the carton (not shown) passes. In the direction of height the detection coil heads $8_1-8_n$ are mounted with a suitable protector near the carton case (not shown) to the extent that they do not contact the latter, or alternatively they are mounted below a non-conductive rubber belt or cloth conveyor. Since the carton (not shown) is also subjected to gauging with a guide on the conveyor 1, the column pitch of the cansa, in the carton (not shown) and the spacing between the detection coil heads $8_1-8_n$ are completely coincident with each other.

If the analog-digital converter 11 is provided by the same number of sets as that of the detection coil heads $8_1-8_n$, the desired object is attained. But using a large number of the same circuit is not efficient, so the scanner 23 was used to switch the same circuit.

The scanner switches the synchronous rectifiers $10_1-10_n$ cyclically at high speed, and also at a speed synchronized therewith the analog-digital converter 11 converts the analog DC voltage signals $S10_1-S10_n$ into digital signals $S1_1-S1_n$.

The scanner 23 uses an analog switch consisting of a FET, and the detection coil heads $8_1-8_n$ may be mounted in a certain depth below a non-conductive conveyor belt.

The memory circuit 3 consists of a combined configuration of a scanner 24 which is preset by the matrix number switching signal S14 from the timing circuit 7 in accordance with the number of rows and columns of the cansa, in the carton (not shown) the scanner 24 functioning to put in order and distribute the digital signals $S1_1-S1_n$ from the detection/conversion circuit 2, and memory circuit 13 in which units $13_1-13_n$ each divided into memory blocks 13a–13c whose number corresponds to the measuring points of each coveral, are provided by the number of columns of the cansa, and the digital signals $S1_1-S1_n$ distributed are temporarily stored in the memory blocks 13a–13c of specified address which received the memory timing signals S7a–S7c from the timing circuit 7, and are read all at once in each of the units $13_1-13_n$ when the final digital signals $S1_1-S1_n$ at the final measuring points of the coversal, have been input. The scanner 24 uses a digital switch consisting of TTL.AND gate, in which the units $13_1-13_n$ are switched cyclically at high speed and in synchronism with the scanner 23 and analog-digital converter 11.

The comparison/decision circuit 5 consists of a combined configuration of the level setter 17 which presets the reference level signal S3; the level comparator 18 as a digital comparator which compares the deviation signals $S2_1-S2_n$ from the arithmetic circuit 4 with the reference level signal S3 and, when the former exceeded the upper or lower limit of the latter, issues the defective signal S4; a flip flop 25 which temporarily stores the defective signal S4; and an AND gate circuit 26 which, when received an inspection-end timing signal S15 from the timing circuit 7, allows the passing output of the defective signal S4.

The timing circuit 7 consists of a combined configuration of the photosensor 19 which detects the passing of the carton (not shown) containing the cansa, arranged in matrix form and issues the passing detection signal S13 for positioning the cansa, with respect to the detection coil heads $8_1$–$8_n$; the pulse generator 21 mounted on the conveyor drive shaft 20 and adapted to generate the clock pulse signal S6 in the unit of second and in synchronism with the movement of the conveyor 1; a timing control circuit 27 which outputs the inspection-end timing signal S15 to the comparison/decision circuit simultaneously with the stop of the passing detection signal S13; the timing counter circuit 22 which, during receipt of the passing detection signal S13, counts the clock pulse signal S6 and outputs the memory timing signals S7a–S7c successively to the memory circuit 3; and a matrix number setter 28 which presets according to the number of rows and columns of the cansa, and manually switches and sets the scanner 23 in the detection/conversion circuit 2 and the scanner 24 in the memory circuit 3 as well as the timing counter 22 through the matrix number switching signal S14 and the row number switching signal S16, respectively. The photosensor 19 consists of a combination of an ordinary phototransistor and light emission diode, and the pulse generator 21 for measuring the movement of the conveyor 1 is one available commercially which generates 100 pulses per rotation, but which has been modified so as to generate one pulse for 1 mm movement of the conveyor 1.

Figure 9:
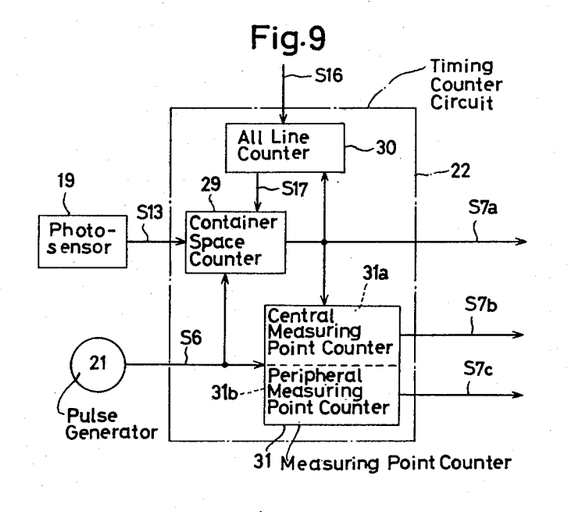
FIG. 9 is a block diagram of a timing counter circuit.

As shown in FIG. 9, the timing counter circuit 22 includes a container space counter 29 which, during receipt of the passing detection signal S13 from the photosensor 19, counts the clock pulse signal S6 from the pulse generator 21 and, each time the number corresponding to the passing time of one row of the cansa, in the carton (not shown) is counted up, issues the memory timing signal S7a to allow the digital signals $S1_1$–$S1_n$ at the initial measuring points of the coversa1, included in one line to be input in regular order to each memory block 13a of all the units $13_1$–$13_n$ in the memory circuit 3; an all line counter 30 which counts the memory timing signal S7a and, each time the number of rows set by the row number switching signal S16 from the matrix number setter 28 is counted up, feedbacks a count stop signal S17 to the container space counter 29; and a measuring point counter 31 which starts to count the clock pulse signal S6 from the time when the memory timing signal S7a was received and, each time the respective numbers corresponding to the periods required for the other measuring points of the cover1, to pass are counted up, issues the memory timing signals S7b, S7c to allow the digital signals $S1_1$–$S1_n$ at the other measuring points to be input in regular order to each memory block 13b or 13c of all the units $13_1$–$13_n$ in the memory circuit 3. If a radial distance of a peripheral measuring point from the central measuring point is taken to be R, when the conveyor 1 has moved by the radius R of the peripheral measuring point of the cana, with the memory timing signal S7a as a trigger pulse, a central measuring point counter 31a counts the clock pulse signal S6 and when counted the number which had been manually set in advance according to the diameter of the cana, it issues the memory timing signal S7b; furthermore, when the conveyor 1 has moved by the same amount a peripheral measuring point counter 31b issues the memory timing signal S7c. In this embodiment, the generation timing of the memory timing signals S7a–S7c is set as tabulated below, which are in such a correlation as shown in the timing chart of FIG. 10.

Figure 10:
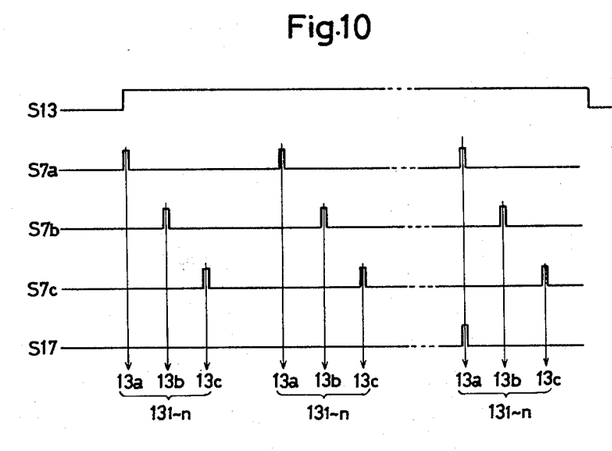
FIG. 10 is a time chart of memory timing signals generated from the said timing counter circuit.

| Can dia. | 77 mm | 68 mm | 55 mm |
| --- | --- | --- | --- |
| Pitch of S7a | 77 mm | 68 mm | 55 mm |
| S7b = S7a + R | +20 mm | +18 mm | +15 mm |
| S7c = S7a + 2R | +40 mm | +36 mm | +30 mm |

Each section of the system B of this invention can be comprised of the combination of commercially available electronic parts except only that the detection coil heads $8_1$–$8_n$ are designed and manufactured according to the diameter of the cana. Specifically, a highly integrated IC package is used for the scanner 23, analog-digital converter 11 and memory circuit 13, and other sections are comprised of TTL type, AND elements, flip flops and a combination of plural flip flops as a register.

Figure 8:
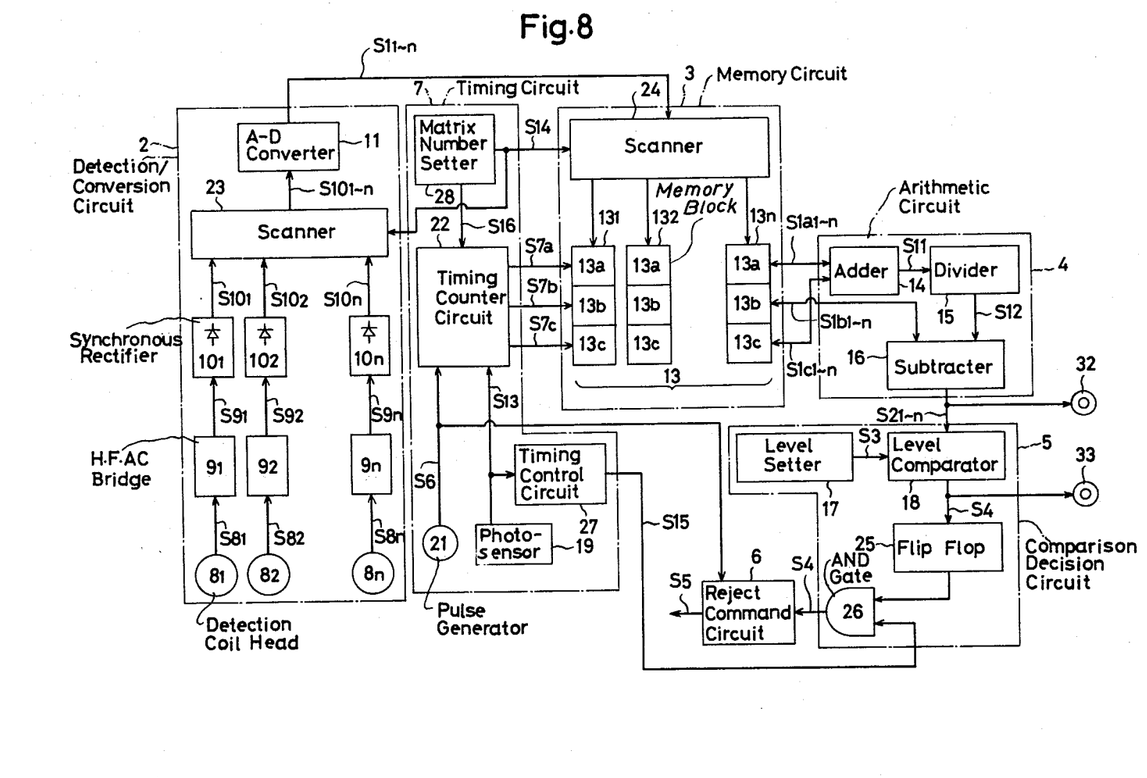
FIG. 8 is a block diagram of system B of this invention according to the flowchart method.

In FIGS. 7 and 8, the reference numeral 32 is a connecting terminal for data arrangement or for display.

Figure 11:
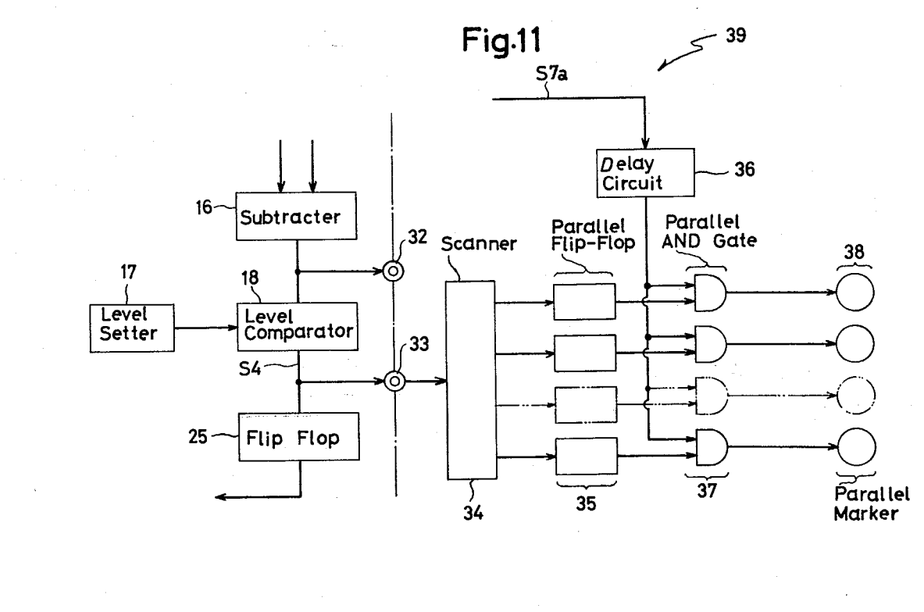
FIG. 11 is a block diagram of a marker circuit attached to the system B of this invention.

As shown in FIG. 11, a marker circuit 39 consists of a combined configuration of a scanner 34, parallel flip-flop circuits 35, a delay circuit 36, parallel AND gate circuits 37 and parallel markers 38. In FIG. 11, the defective signal S4 from the level comparator 18 is taken out from a connecting terminal 33 for marker circuit and the marker circuit 39 configured as above is actuated to put a mark on the carton (not shown) in a position corresponding to the position in which is housed the cana, which has been determined as defective in internal pressure. The parallel markers 38 are attached to the corresponding detection coil heads $8_1$–$8_n$ so as to project therefrom and spaced by a line pitch, and the delay time of the delay circuit 36 is a period of second corresponding to a line pitch of the conveyor 1.

The inspection procedure according to this invention applied to system B of the invention is described below with reference to FIGS. 8 through 10.

When the photosensor 19 detects the front end of the carton case (not shown) containing the cansa, to be inspected and being conveyed on the conveyor 1, the memory timing signal S7a is issued from the timing counter circuit 22, which is logically ANDed with the switching operation of the scanner 24, and the digital signals $S1_1$–$S1_n$ are written in regular order to each memory block 13a of all the units $13_1$–$13_n$. The measured values written in the memory device are values measured at the detection coil heads $8_1$–$8_n$ respectively and correspond to the initial peripheral measuring points of n number of cansa, arranged at the first line out of the cansa, housed in the carton (not shown).

As the carton (not shown) is further conveyed by the conveyor 1 and when the center of each cana, at the first line has reached just under each of the detection coil heads $8_1$–$8_n$, the second memory timing signal S7b is issued and, in the same manner as in the preceding memory timing signal S7a, the digital signals $S1_1$–$S1_n$ are written to each memory block 13b of all the units $13_1$–$13_n$ by an ANDing operation with the scanner 24. These values correspond to the measured values at the centers O of the cansa, arranged in the first line.

When the carton (not shown) has further moved by the distance of a peripheral measuring point, the third memory timing signal S7c is issued and, in the same manner as in the preceding memory timing signals S7a, S7b, the digital signals $S1_1$–$S1_n$ are written in each memory block 13c of all the units $13_1$–$13_n$ by an ANDing operation with the scanner 24. These values correspond to the second peripheral measuring points of the cansa, arranged at the first line. Now all the measured values with respect to the cans at the first line have been input to the memory circuit 13.

With respect to the cansa, arranged at the first line, a decision as to whether they are non-defective or defective must be completed before the measurement for the cansa, arranged at the second line is started. Therefore, immediately after completion of the memory operation, the measured values on the cana, disposed in the first column of the first line, namely digital signals $S1a_1$, $S1b_1$, $S1c_1$ are read at high speed in the order of earlier memory input, units $13_1$–$13_n$, and the following arithmetic operation is performed like that explained in connection with the system A of this invention:

$$\{(S1a_1)+(S1c_1)\}\tfrac{1}{2}-(S1b_1)$$

The operation within the above brackets is performed by the adder 14 and multiplication by $\tfrac{1}{2}$ is executed by the divider 15. But all these values are binary digits, so, without using special devices, the results of addition may be merely shifted to the right, that is, the position of the decimal point may be shifted up by one place.

The subtraction of the digital signal $S1b$ is performed by the subtractor 16 and the difference is compared with the reference level signal S3 which has manually been set by the digital level comparator 18, and the defective signal S4 is obtained for a defective unit.

If the cana, at the first column of the first line is defective, the defective signal S4 is temporarily stored in the 1-bit flip flop 25.

Immediately after completion of the decision on the cana, located at the first column of the first line, a decision is made on the cana, at the second column of the first line; that is, with respect to the values of each memory block $13b$ of all the units $13_1$–$13_n$ there is performed the same arithmetic operation as the foregoing subtraction for the sum of the memory blocks $13a$ and $13c$ of all the units $13_1$–$13_n$, and a decision for non-defective or defective is made and the occurrence of a defect, if any, is stored in the flip flop 25. In case the preceding can was defective, the defective signal S4 is already stored, so the memory condition retains as it is.

In the same way, the third to the last cana, in the first line, 4 to 6 cans in this embodiment, are subjected to operation and decision up to a separately, manually selected number. When the decision on all the cansa, arranged in the first line is over, the memory circuits 13 are all reset to zero, ready for the next measurement. Since these arithmetic operations are performed at high speed with a 0.5 $\mu$s clock pulse, there is a sufficient time margin until the measurement of the cansa, at the second line is started.

In the measurement for the cansa, arranged at the second line, when the conveyor 1 has further moved and the initial peripheral measuring points of the second-line cansa, have advanced under the detection coil heads $8_1$–$8_n$, the first memory timing signal S7a is again issued from the timing counter circuit 22; that is, the container space counter 29 built in the timing counter circuit 22 counts the clock pulse signal S6 from the pulse generator 21 to measure the movement of the conveyor 1 and, at every movement by an amount which has manually been set according to the size of the cana, and the spacing thereof in the carton, there issues the memory timing signal S7a, in other words, the memory timing signal S7a is issued at every movement of the pitch of one can.

In the same manner, the generation of the memory timing signal S7a is repeated at every movement of the conveyor 1 set in the container space counter 29, subsequently there issue the memory timing signals S7b, S7c and the measurement and decision on the third-line cans are performed, and these operations are repeated up to the cansa, arranged in the last line.

The total number of lines is predetermined according to the number of lines of the cansa, in the carton case (not shown) being handled and, when the memory timing signal S7a has been counted up to the number which has manually been set in the all line counter 30, the operation of the container space counter 29 is stopped.

In this embodiment, the manually set number of lines was taken to be a minimum of 3 and a maximum of 8, while the number of cans in one line, namely the number of channels of the scanners 23, 24 in FIG. 8 which corresponds to the number of columns of cans, was taken to be a minimum of 4 and a maximum of 6, so that from a minimum of 12 cans to a maximum of 48 cans could be inspected.

Soon after a decision is made on the last can in this manner, the rear end of the carton (not shown) is detected by the photosensor 19. The inspection-end timing signal S15 issued upon detection of the rear end of the case is ANDed with the defective signal S4 stored in the flip flop 25 by the AND gate circuit 26, and the defective signal S4 is output to the reject command circuit 6.

The reject command circuit 6 generates the reject signal S5 for excluding the case (not shown) which contains a defective can from the conveyor 1 in synchronism therewith by means of an air cylinder or the like. For the synchronous delay of the signal there is adopted a shift register.

In the system B of this invention, all the processings of memory and operation, comparison, decision and reject commands were comprised of hard-wired logic, but it goes without saying that all the operations after the analog-digital converter in FIG. 8, namely from the scanner 24 to the reject command circuit, may be substituted by a software program using a microcomputer.

What we claim is:

1. An internal pressure inspecting method for hermetically sealed containers, comprising determining the degree of unevenness of the surface of an elastic wall of each hermetically sealed container caused by its internal pressure, by generating a signal that varies as a function of the distance from a fixed position exterior of the hermetically sealed container to said wall surface at a plurality of points and, with a value derived by calculation from the values of said signals, determining the degree of unevenness of said surface of said hermetically sealed container.

2. The internal pressure inspecting method for hermetically sealed containers as defined in claim 1, in which said step of measuring said distance comprises determining the change in inductance in an inductor magnetically influenced by said wall utilizing electromagnetic induction.

3. The internal pressure inspecting method for hermetically sealed containers as defined in claim 1, in which the determination at said plurality of points is a multi-point determination at least in the central and peripheral portions of the cover of each container.

4. The internal pressure inspecting method for hermetically sealed containers as defined in claim 3, in which the plurality of points in the peripheral portion are any one point and the position on the diametrical line which is in symmetrical relation therewith with the center of the container cover as the center of symmetry.

5. The internal pressure inspecting method for hermetically sealed containers as defined in claim 1, in which the value derived by calculation derived at least from the difference between said signal values at the central and peripheral portions of the container cover.

6. The internal pressure inspecting method for hermetically sealed containers as defined in claim 1, in which the value derived by calculation is derived from the difference between a mean value of both signal values at any one point in the peripheral portion and at the position on the diametrical line which is in symmetrical relation therewith with the center of the container cover as the center of symmetry, and the signal value at the center of the container cover.

7. The internal pressure inspecting method for hermetically sealed containers as defined in claim 1, in which the determination at said plurality of points is conducted by measuring the passing time of each of the predetermined measuring points on the diametrical line of the container cover which is coincident with the advancing direction of each of hermetically sealed containers while the latter are conveyed at a constant speed.

8. The internal pressure inspecting method for hermetically sealed containers as defined in claim 1, in which the measurement and inspection of the internal pressure are conducted collectively for a plurality of hermetically sealed containers.

9. The internal pressure inspecting method for hermetically sealed containers as defined in claim 1, in which the measurement and inspection of the internal pressure are conducted through a carton containing a plurality of hermetically sealed containers arranged in regular order.

10. The internal pressure inspecting method for hermetically sealed containers as defined in claim 8, in which said collective measurement and inspection of the internal pressure for a plurality of hermetically sealed containers is conducted in synchronism with the passing speed of a carton which contains the plurality of hermetically sealed containers in matrix form.

11. An internal pressure inspecting system for hermetically sealed containers, comprising a detection/conversion circuit means connected to convert a signal varying with the change in effective inductance of an inductor as a function of the degree of unevenness of measuring points in the central and peripheral portions located on the diametrical line of the cover of each said hermetically sealed container, conveyor means for conveying said containers at a constant speed past said inductor at a fixed position, said detection/conversion circuit means converting said signal into a DC voltage and being connected to output the latter as a digital signal, a memory circuit means connected to temporarily store the digital signal from said detection/conversion circuit means for each said measuring point and, simultaneously with input of the digital signal at the final measuring point of the cover of each said containers, and for reading and updating the digital signals all at once; an arithmetic circuit means connected to calculate a mean value from the digital signals in said peripheral portion, then to a deviation value thereof from the digital signal at the central measuring point of the cover of each said container; a comparison/decision circuit means for comparing the deviation signal from said arithmetic circuit means with a preset reference level signal and, when the deviation exceeds the upper or lower limit of said reference level signal, for outputting a defective signal; a reject command circuit means responsive to the defective signal from said comparison/decision circuit means for outputting a reject signal after a predetermined delay in the unit of second; and a timing circuit means for sending a clock pulse signal which is synchronized with the movement of the conveyor to said reject command circuit means at the time of passing of each said hermetically sealed container, while at the same time counting said clock pulse signal and sending memory timing signals successively to said memory circuit means.

12. The internal pressure inspecting system for hermetically sealed containers as defined in claim 11, in which said detection/conversion circuit means comprises a combined configuration of a detection coil head positioned to have an effective inductance that varies according to the degree of unevenness of the measuring points in the central and peripheral portions located on the diametrical line of the cover of each said hermetically sealed container which passes just under said fixed position; an AC bridge circuit for producing an AC voltage signal which varies in response to variations of said effective inductance; a synchronous rectifier for rectifying said AC voltage signal and converting it into a DC voltage signal; and an analog-digital converter for converting said DC voltage signal into a digital signal and outputting the latter.

13. The internal pressure inspecting system for hermetically sealed containers as defined in claim 11, in which said memory circuit means comprises a combination of AND gate circuits disposed in parallel according to the number of the measuring points on the diametrical line of the cover of each said hermetically sealed container, said AND gate circuits being adapted to allow the passing output of the digital signals from said detection/conversion circuit means upon receipt of the memory timing signals from said timing circuit means, and memory circuits disposed in parallel and connected in series with said AND gate circuits, said memory circuits functioning to temporarily store said digital signals each separately and read all the digital signals simultaneously when the final digital signal from each of said hermetically sealed container has been input.

14. The internal pressure inspecting system for hermetically sealed containers as defined in claim 11, in which said arithmetic circuit means comprises a combined configuration of an adder for adding all the digital signals read from said memory circuit means except the digital signal at the center of the cover of each said hermetically sealed container, and for outputting an addition signal; a divider for dividing said addition signal by the number of the added digital signals and outputting a mean value signal; and a subtractor for subtracting the digital signal at the center of the container cover from said mean value and outputs a deviation signal.

15. The internal pressure inspecting system for hermetically sealed containers as defined in claim 11, in which said comparison/decision circuit means comprises a combined configuration of a level setter for presetting a reference level signal, and a level comparator for comparing the deviation signal from said arithmetic circuit means with said reference level signal and for outputting a defective signal when said deviation signal has exceeded the upper or lower limit of said reference level signal.

16. The internal pressure inspecting system for hermetically sealed containers as defined in claim 11, in which said timing circuit means comprises a combined configuration of a sensor for detecting the passing of each said hermetically sealed container and for generating a passing detection signal for positioning said hermetically sealed container with respect to said detection coil head; a pulse generator for generating in the unit of second a clock pulse signal in synchronism with the movement of the conveyor; and a timing counter circuit connected to count, during receipt of said passing detection signal, said clock pulse signal and memory timing signals successively to said memory circuit means.

17. The internal pressure inspecting system for hermetically sealed containers as defined in claim 11, in which said detection/conversion circuit means comprises a combined configuration of detection coil heads in a number corresponding to the number of columns of containers and positioned to vary their effective inductance according to the degree of unevenness of the measuring points in the central and peripheral portions on the diametrical line coincident with the advancing direction of each cover in each column of the hermetically sealed containers which are arranged in matrix form within a carton passing just under said fixed position at a constant speed; AC bridge circuits disposed in parallel and connected in series with said detection coil heads, said AC bridge circuits functioning to produce AC voltage signals separately and successively in response to said variable effective inductances; synchronous rectifiers disposed in parallel and connected in series with said AC bridge circuits, said synchronous rectifiers functioning to rectify said AC voltage signals separately and convert them into DC voltage signals; a scanner which is preset by a matrix number switching signal from said timing circuit means in accordance with the number of rows and columns of the hermetically sealed containers, said scanner functioning to input said DC voltage signals simultaneously in parallel, put them in order and output them in orderly manner; and an analog-digital converter for converting the DC voltage signals from said scanner one by one into digital signals and outputting the latter.

18. The internal pressure system for hermetically sealed containers as defined in claim 11, in which said memory circuit means comprises a combination of a scanner connected to be preset by a matrix number switching signal from said timing circuit means in accordance with the number of rows and columns of the hermetically sealed containers housed in a carton case, said scanner functioning to put in order and distribute the digital signals from said detection/conversion circuit means, and memory circuits in which units each divided into memory blocks whose number corresponds to the measuring points of each container cover are provided in the number of columns of the hermetically sealed containers, said memory circuit means functioning to temporarily store said distributed digital signals in said memory blocks which received memory timing signals from said timing circuit means and read the digital signals all at once in each of said units when the final digital signals at the final measuring points of the container covers have been input.

19. The internal pressure inspecting system for hermetically sealed containers as defined in claim 11, in which said comparison/decision circuit means comprises a combination of a level setter connected to preset the reference level signal; a level comparator for comparing the deviation signal from said arithmetic circuit with said reference level signal and, when the former exceeds the upper or lower limit of the latter, is connected to issue a defective signal; a flip flop for temporarily storing said defective signal; and an AND gate circuit which, when receiving an inspection-end timing signal from said timing circuit means, is connected to allow the passing of the output of said defective signal.

20. The internal pressure inspecting system for hermetically sealed containers as defined in claim 11, in which said timing circuit means comprises a combined configuration of a sensor for detecting the passing of a carton containing the hermetically sealed containers in matrix form and for issuing a passing detection signal for positioning said containers with respect to said detection coil heads; a pulse generator connected to generate a clock pulse signal in the unit of second and in synchronism with the movement of the conveyor; a timing control circuit connected to output an inspection-end timing signal to said comparison/decision circuit means upon cessation of said passing detection signal; a timing counter circuit connected to count, during receipt of said passing detection signal, said clock pulse signal and to output memory timing signals successively to said memory circuit means; and a matrix number setter connected to preset according to the number of rows and columns of the hermetically sealed containers, and to switch and set the scanner in said detection/conversion circuit means and in said memory circuit means as well as said timing counter circuit through a matrix number switching signal and a row number switching signal, respectively.

21. The internal pressure inspecting system for hermetically sealed containers as defined in claim 11, in which said timing counter circuit includes a container space counter connected to count, during receipt of the passing detection signal from the sensor, the clock pulse signal from the pulse generator and, each time the number corresponding to the passing time of one row of the hermetically sealed containers housed in a carton is counted up, to issue a memory timing signal to allow the digital signals at the initial measuring points of the container covers in one row to be input in regular order to said memory circuit means; an all line counter connected to count said memory timing signal and, each time the number of rows set by the row number switching signal from the matrix number setter is counted up, to feedback a count stop signal to said container space counter; and a measuring point counter which starts to count said clock pulse signal from the time when said memory timing signal was received and, each time the respective numbers corresponding to the periods required for the other measuring points of each said container cover to pass are counted up, to issue memory timing signals to all the digital signals at said other measuring points to be input in regular order to said memory circuit means.

22. A method for inspecting internal pressure in hermetically sealed containers by moving a coil over a plurality of points on each conductive container cover comprising generating a plurality of current signals as a result of the change in effective inductance between the cover and detection coil in proportion to the distance from said detection coil arranged at any fixed position exterior of the hermetically sealed container to said container cover according to the degree of unevenness of a plurality of measuring points in the central and peripheral portions on the container cover, converting said current signals into digital signal as a measured value, storing sequentially each said measured value signal in memory means, each memory means corresponding to the central and peripheral measuring points, in accordance with each measuring point until the measured value signal at the final measuring point is obtained and stored and outputting all the measured value signals from said memory means at once on receiving it, deriving a deviation value from the difference signal through operation from the difference between the measured value signal in the central portion and a mean value of the measured value signals in the peripheral portions, comparing said deviation value signal with a preset reference level and generating a can defect signal when the deviation value signal exceeds the upper or lower limit of said reference level signal, and outputting a reject command signal upon synchronous receipt of said can defect signal.

23. The method for inspecting internal pressure in hermetically sealed containers by measuring at a plurality of points on each conductive container cover as defined in claim 22 in which the plurality of measuring points in the peripheral portion are any one point and the position on the diametrical line which is in symmetrical relation therewith with the center of the container cover as the center of symmetry.

24. The method for inspecting internal pressure in hermetically sealed containers by measuring at a plurality of points on each conductive container cover as defined in claim 22 in which the deviation value signal derived through operation is the difference between the mean value signal of both measured value signals at any one point in the peripheral portion and at the position on the diametrical line which is in symmetrical relation therewith with the center of the container cover as the center of symmetry, and the measured value signal at the center of the container cover.

25. The method for inspecting internal pressure in hermetically sealed containers by measuring at a plurality of points on each conductive container cover as defined in claim 22, in which the measurement at a plurality of points comprises measuring the passing time of each of the predetermined measuring points on the diametrical line of the container cover which is coincident with the advancing direction of each of the hermetically sealed containers while the latter are conveyed at a constant speed.

26. The method for inspecting internal pressure in hermetically sealed containers by measuring on each conductive container cover as defined in claim 22, in which the measurement and inspection of the internal pressure effected for a plurality of hermetically sealed containers in a collective manner.

27. The method for inspecting internal pressure in hermetically sealed containers by measuring at a plurality of points on each conductive container cover as defined in claim 22, in which the measurement and inspection of the internal pressure are effected through a carton case containing a plurality of hermetically sealed containers arranged in regular order.

28. The method for inspecting internal pressure in hermetically sealed containers by measuring at a plurality of points on each conductive container cover as defined in claim 26, in which said collective measurement and inspection of the internal pressure for a plurality of hermetically sealed containers is effected in synchronism with the passing speed of a carton case which contains the plurality of hermetically sealed containers in matrix form.

29. A system for inspecting internal pressure in hermetically sealed containers by measuring at a plurality of points on each conductive container cover, comprising an interconnected system of a detection/conversion circuit means which converts the change of effective inductance in a detection coil head according to the degree of unevenness of a plurality of measuring points in the central and peripheral portions located on the diametrical line of the cover of each hermetically sealed container which pass very near to said detection coil head at any fixed position at a constant speed by a conveyor, into a DC voltage and outputs the latter as a digital signal of a measured value, a memory circuit means which temporarily stores in each memory block the digital signal from said detection/conversion circuit means for each said measuring point and, simultaneously with input of the digital signal at the final measuring point of the cover of each said container, reads and updates the digital signals all at once; an arithmetic circuit means which calculates a mean value of all the digital signals in said peripheral portion, then obtains a deviation value signal thereof from the digital signal at the central measuring point of the cover of each said container; a comparison/decision circuit means which compares the deviation value signal from said arithmetic circuit means with a preset reference level signal and, when the deviation value signal exceeds the upper or lower limit of said reference level signal, outputs a defective signal; a reject command circuit means which when receiving the defective signal from said comparison/decision circuit means outputs a reject signal after a predetermined delay in the unit of second; and a timing circuit means which sends a clock pulse signal which is synchronized with the movement of the conveyor to said reject command circuit means at the time of passing of each said hermetically sealed container, while at the same time counts said clock pulse signal and sends memory timing signals successively to said memory circuit means.

30. The system for inspecting internal pressure in hermetically sealed containers by measuring at a plurality of points on each conductive container cover as defined in claim 29, in which said detection/conversion circuit means comprises a combined configuration of the detection coil head which detects an induced current signal induced according to the degree of unevenness of the measuring points in the central and peripheral portions located on the diametrical line of the cover of each said hermetically sealed container which passes just under said fixed position at a constant speed by the conveyor; an AC bridge circuit which unbalancedly generates an AC voltage signal successively on the basis of said induced current signal; a synchronous rectifier which rectifies said AC voltage signal and converts it into a DC voltage signal; and an analog-digital converter which converts said DC voltage signal into a digital signal and outputs the latter.

31. The system for inspecting internal pressure in hermetically sealed containers by measuring at a plurality of points on each conductive container cover as defined in claim 29, in which said memory circuit means comprises a combination of AND gate circuits disposed in parallel according to the number of the measuring points on the diametrical line of the cover of each said hermetically sealed container, said AND gate circuits being adapted to allow the passing output of the digital signals from said detection/conversion circuit means upon receipt of the memory timing signals from said timing circuit means, and memory circuits disposed in parallel and connected in series with said AND gate circuits, said memory circuits functioning to temporarily store said digital signals each separately and read all the digital signals simultaneously when the final digital signal from cover of each said hermetically sealed container has been input.

32. The system for inspecting internal pressure in hermetically sealed containers by measuring at a plurality of points on each conductive container cover as defined in claim 29, in which said arithmetic circuit means comprises a combined configuration of an adder which adds all the digital signals read from said memory circuit means except the digital signal at the center of the cover of each said hermetically sealed container, and outputs an addition signal; a divider which divides said addition signal by the number of the added digital signals and outputs a mean value signal; and a subtractor which subtracts the digital signal at the center of the container cover from said mean value and outputs a deviation signal.

33. The system for inspecting internal pressure in hermetically sealed containers by measuring at a plurality of points on each conductive container cover as defined in claim 29, in which said comparison/decision circuit means comprises a combined configuration of a level setter which presets a reference level signal, and a level comparator which compares the deviation signal from said arithmetic circuit means with said reference level signal and outputs a defective signal when said deviation signal has exceeded the upper or lower limit of said reference level signal.

34. The system for inspecting internal pressure in hermetically sealed containers by measuring at a plurality of points on each conductive container cover as defined in claim 29, in which said timing circuit means comprises a combined configuration of a sensor which detects the passing of each said hermetically sealed container and generates a passing detection signal for positioning said hermetically sealed container with respect to said detection coil head; a pulse generator which generates in the unit of second a clock pulse signal in synchronism with the movement of the conveyor, and a timing counter circuit which, during receipt of said passing detection signal, counts said clock pulse signal and memory timing signals successively to said memory circuit means.

35. The system for inspecting internal pressure in hermetically sealed containers by measuring at a plurality of points on each conductive container cover as defined in claim 29, in which said detection/conversion circuit means comprises a combined configuration of detection coil heads provided by the number corresponding to the number of columns and adapted to detect simultaneously in parallel the induced current signals which have been induced according to the degree of unevenness of the measuring points in the central and peripheral portions on the diametrical line coincident with the advancing direction of each cover in each column of the hermetically sealed containers which are arranged in matrix form within a carton case passing just under said fixed position at a constant speed by the conveyor; AC bridge circuits disposed in parallel and connected in series with said detection coil heads, said AC bridge circuits functioning to unbalancedly generate AC voltage signals separately and successively on the basis of said induced current signals; synchronous rectifiers disposed in parallel and connected in series with said AC bridge circuits, said synchronous rectifiers functioning to rectify said AC voltage signals separately and convert them into DC voltage signals; a scanner which is preset by a matrix number switching signal from said timing circuit means in accordance with the number of rows and columns of the hermetically sealed containers, said scanner functioning to input said DC voltage signals simultaneously in parallel, put them in order and output them in orderly manner; and an analog-digital converter which converts the DC voltage signals from said scanner one by one into digital signals and outputs the latter.

36. The system for inspecting internal pressure in hermetically sealed containers by measuring at a plurality of points on each conductive container cover as defined in claim 29, in which said memory circuit means comprises a combined configuration of a scanner which is preset by a matrix number switching signal from said timing circuit means in accordance with the number of rows and columns of the hermetically sealed containers housed in a carton case, said scanner functioning to put in order and distribute the digital signals from said detection/conversion circuit means, and memory circuits in which units each divided into memory blocks whose number corresponds to the measuring points of each container cover are provided by the number of columns of the hermetically sealed containers, said memory circuit means functioning to temporarily store said distributed digital signals in said memory blocks which received memory timing signals from said timing circuit means and read the digital signals all at once in each of said units when the final digital signals at the final measuring points of the container covers have been input.

37. The system for inspecting internal pressure in hermetically sealed containers by measuring at a plurality of points on each conductive container cover as defined in claim 29, in which said comparison/decision circuit means consists of a combined configuration of a level setter which presets the reference level signal; a level comparator which compares the deviation signal from said arithmetic circuit with said reference level signal and, when the former exceeds the upper or lower limit of the latter, issues a defective signal; a flip flop which temporarily stores said defective signal; and an AND gate circuit which, when receiving an inspection-end timing signal from said timing circuit means, allows the passing output of said defective signal.

38. The system for inspecting internal pressure in hermetically sealed containers by measuring at a plurality of points on each conductive container cover as defined in claim 29, in which said timing circuit means comprises a combined configuration of a sensor which detects the passing of a carton case containing the hermetically sealed containers in matrix form and issues a passing detection signal for positioning said containers with respect to said detection coil heads; a pulse generator which generates a clock pulse signal in the unit of second and in synchronism with the movement of the conveyor; a timing control circuit which outputs an inspection-end timing signal to said comparison/decision circuit means upon cessation of said passing detection signal, counts said clock pulse signal and outputs memory timing signals successively to said memory circuit means; and a matrix number setter which presets according to the number of rows and columns of the hermetically sealed containers, and switches and sets the scanners in said detection/conversion circuit means and in said memory circuit means as well as said timing counter circuit through a matrix number switching signal and a row number switching signal, respectively.

39. The system for inspecting internal pressure in hermetically sealed containers by measuring at a plurality of points on each conductive container cover as defined in claim 29, in which said timing counter circuit includes a container space counter which, during receipt of the passing detection signal from the sensor, counts the clock pulse signal from the pulse generator and, each time the number corresponding to the passing time of one row of the hermetically sealed containers housed in a carton case is counted up, issues a memory timing signal to allow the digital signals at the initial measuring points of the container covers in one row to be input in regular order to said memory circuit means; an all line counter which counts said memory timing signal and, each time the number of rows set by the row number switching signal from the matrix number setter is counted up, feedbacks a count stop signal to said container space counter; and a measuring point counter which starts to count said clock pulse signal from the time when said memory timing signal was received and, each time the respective numbers corresponding to the periods required for the other measuring points of each said container cover to pass are counted up, issues memory timing signals to all the digital signals at said other measuring points to be input in regular order to said memory circuit means.

* * * * *